Figure 5:
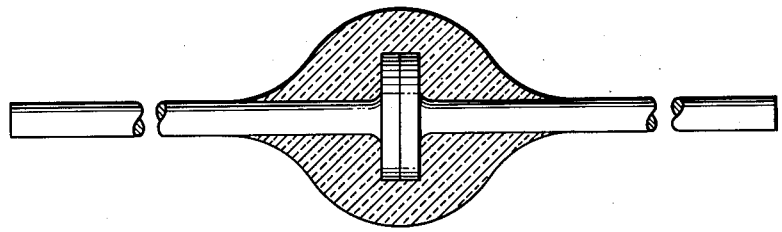

Aug. 11, 1964   C. P. BRUEN ETAL   3,144,318
COATING ELECTRONIC DEVICES
Filed Feb. 12, 1960

LOW-MELTING GLASS PRE-FORM

AXIAL DIODE

INVENTORS
CHARLES P. BRUEN
KARL W. DIECKMANN
BY
*Ernest A. Polin*
ATTORNEY

3,144,318
COATING ELECTRONIC DEVICES

Charles P. Bruen, Mount Freedom, and Karl W. Dieckmann, Morris Plains, N.J., assignors to Allied Chemical Corporation, New York, N.Y., a corporation of New York
Filed Feb. 12, 1960, Ser. No. 8,381
12 Claims. (Cl. 65—18)

This invention relates to a process for coating electronic devices with low-melting glass.

One of the objects of the invention is to provide an improved process for applying low-melting glass coatings to electronic devices. Another object is to provide improved processes for producing low-melting glass powders and pre-forms for use in coating electronic devices. Other objects and advantages will be apparent in the following description and examples.

The low-melting glasses contemplated by the present invention soften at about 25° to 200° C., melt at about 250° to 400° C. and are composed of two or more of sulfur, arsenic, thallium, iodine and lead. Typical compositions comprise arsenic-sulfur (e.g., 30% by weight arsenic and 70% by weight sulfur) and arsenic-thallium-sulfur (e.g., 35% by weight arsenic, 5% by weight thallium and 60% by weight sulfur). These low-melting glasses are made by mixing the elements in the proportions desired in a suitable container and heating the container until a completely liquid melt is obtained. The melt is agitated sufficiently to insure homogeneity and is then cooled to room temperature to form glass ingots.

Prior art workers have used low-melting (about 250° to 400° C.) glass as a protective coating for electronic devices and particularly for semi-conductors such as diodes, transistors, rectifiers, etc. The conventional procedure is to dip the electronic device in molten glass to coat the device with a layer of the glass which solidifies on cooling. Although for many purposes this operation is entirely suitable, the dipping temperatures of 250° to 400° C. adversely affect certain devices, including germanium semi-conductors. Moreover, sulfur-containing glass compositions, at the temperatures required for dipping, preferentially tend to volatilize the sulfur. Thus, the composition may be continually altered in the dipping operation with resultant variation in the softening point and brittleness of the glass.

We have now discovered that electronic devices may be coated by placing a low-melting glass pre-form of suitable configuration over the device and then heating the device to temperature about 100° to 200° C., preferably about 125° to 150° C., above the softening point of the glass. This causes slow-flowing of the glass over the device so that it becomes encapsulated in the glass.

Low-melting glasses may react with oxygen at elevated temperatures; hence, the heating operation should be carried out in an inert atmosphere such as nitrogen, helium or argon gas.

The coating process of this invention possesses the distinct advantage over the conventional dipping procedure of permitting use of substantially lower temperatures with any given low-melting glass. These lower temperatures may be used safely in the encapsulation of electronic devices, including germanium semi-conductors, with assurance of uniformity of quality of the protective coating.

The pre-forms used in the coating procedure are conveniently prepared from low-melting glass powders. In conventional processes for making the low-melting glass powders, glass ingots are broken up into small chunks and then subjected to grinding, as by ball milling. The glass is usually difficult to grind to desired small mesh size and consequently becomes contaminated during the operation. Such glass is unsatisfactory for use in coating electronic devices since it tends to contaminate the devices.

We have found that low-melting glass powders of high purity may be produced by immersing glass chunks in a liquefied inert gas, preferably liquid nitrogen, until approximately thermal equilibrium is attained, separating the chunks from the liquefied gas and then grinding the chunks to form particles of desired mesh size. If particularly small mesh size glass powder is desired, the particles may be immersed in additional liquefied gas and the operation repeated. The treatment with liquefied gas is desirably accomplished by placing the glass chunks or particles in a polyethylene bag and then immersing the bag in the liquefied gas.

Although liquid nitrogen is preferred, other liquefied inert gases may be used, including liquid forms of helium, air, argon, etc. The action of the liquefied gas appears to be two-fold. First, it decreases the resiliency of the glass and, secondly, causes mechanical strain by reason of thermal shock. As a result, the glass is easier to grind and consequently becomes far less contaminated.

Similarly, the glass chunks may be prepared from glass ingots by immersing vessels containing the ingots in a liquefied inert gas until approximately thermal equilibrium is attained. As a result of the effect of the liquefied gas, the glass contracts from the vessel walls and spontaneously breaks into easily removable chunks suitable for grinding.

If desired or required, the chunks removed from the vessels may be directly ground to form the desired glass particles. As indicated above, if particularly small mesh size powder is desired, the particles may be immersed in additional liquefied gas and the operation repeated.

The low-melting glass pre-forms are generally produced by cold pressing the low-melting glass powder to predetermined configuration and then heating the pressed glass to temperature between the softening point of the glass and up to 100° C. thereabove, preferably between about 25° and 50° C. above the softening point of the glass, until the glass particles cohere to form a physically strong structure.

We have found that glasses which soften below about 75° C. may be converted to pre-forms of suitable strength by simpy cold pressing the glass powder to predetermined configuration, i.e., without heat-treating the pressed glass.

The mesh size required for cold pressing low-melting glass powder into a pre-form depends upon the size of the pre-form desired, the mesh size being increased in the case of larger pre-forms. Generally speaking, it is desirable that the mesh size of the powder be such that 100% passes through a 40 mesh screen and is retained upon a 100 mesh screen.

The cold pressing operation may be suitably carried out using any standard tabletting machine at room temperature.

The following example illustrates the production of the low-melting glass powders and pre-forms of the present invention. In the example, parts are by weight.

Example 1

350 parts of sulfur were mixed with 150 parts of arsenic, and the mixture was heated in a quartz flask to a temperature in excess of 500° C. After the reaction was complete, as evidenced by complete dissipation of the exothermic heat of reaction, and the product had been agitated sufficiently to insure homogeneity, the molten glass was poured under a nitrogen atmosphere into quartz crucibles, which were allowed to cool to room temperature. When the glass had cooled to room temperature, the crucibles were placed in liquid nitrogen. As a result of the low temperature of liquid nitrogen, the glass ingots contracted from the crucible walls and broke up into easily removable chunks suitable for grinding.

The glass chunks were placed in an alumina-lined jar mill containing "Stellite" (cobalt-chromium-tungsten alloy) balls. Liquid nitrogen was then poured into the mill to immerse the glass chunks. After the liquid nitrogen had evaporated, the mill was capped and placed on rollers having a speed of 70 r.p.m. where grinding took place. At one hour intervals, the mill was opened and the glass was again immersed in liquid nitrogen, the liquid nitrogen allowed to evaporate and grinding continued. In about 4 hours the glass particles obtained were such that 80% passed through a 30 mesh screen. The glass particles were then screened to obtain a powder which could pass through a 40 mesh screen and be substantially retained upon a 100 mesh screen.

The glass powder so obtained was cold pressed to predetermined configuration using a "Stokes JP4" tableting press. The cold compressed pre-form was then heated to a temperature of about 125° C., whereby the particles of glass cohered to form a physically strong structure.

The following example illustrates a specific method for coating a semi-conductor axial diode with a low-melting glass.

*Example 2*

The low-melting glass pre-form of Example 1, composed of 70% by weight sulfur and 30% by weight arsenic, was placed over an axial diode and heated in an oven in an atmosphere of nitrogen to a temperature of about 220° C. The glass flowed slowly over the device and encapsulated it, thereby providing an effective protective coating for the device.

Figure 4:
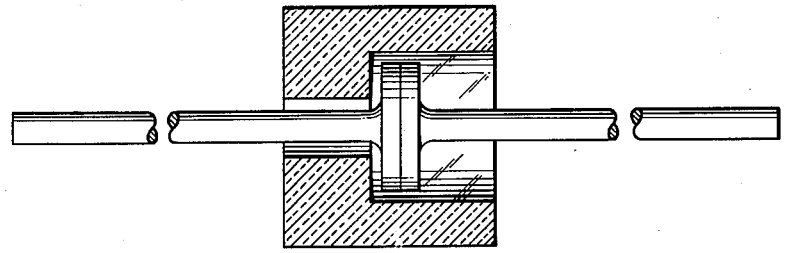
Figure 2:
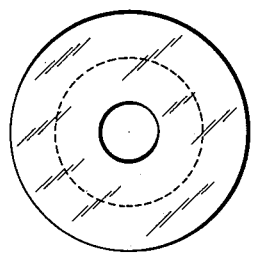
Figure 3:
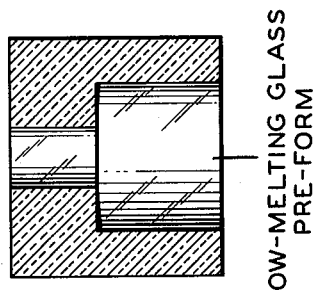
Figure 1:
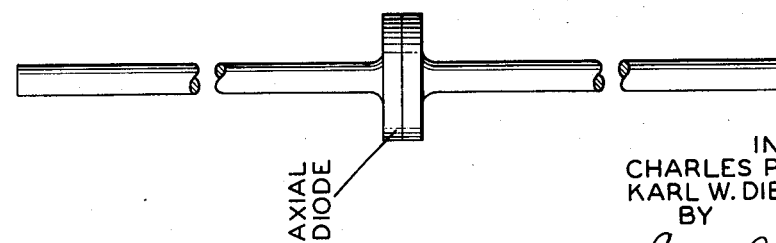

The steps involved in the coating of the axial diode are illustrated in the attached drawing in which FIGURE 1 shows a side elevational view of the diode; FIGURE 2 shows a plan view of the pre-form; FIGURE 3 is a vertical cross-section taken through the pre-form shown in FIGURE 2; FIGURE 4 shows a side elevational view, partly in section, of the pre-form placed over the diode and FIGURE 5 shows a side elevational view, partly in section, of the coated diode.

While we have described the preferred embodiments for carrying out our invention, it will be apparent that many changes may be made without departing from the spirit of the invention.

It is to be understood that the appended claims are meant to include processes in which the glass particles are immersed in additional liquefied gas and again ground to form a smaller mesh size powder.

We claim:

1. A process for producing a pre-form of low-melting glass which comprises immersing chunks of low-melting glass having a melting point of about 250° to 400° C. in a liquefied inert gas until approximately thermal equilibrium is attained, the chunks being cooled by evaporation of the liquefied gas, separating the glass chunks from the liquefied gas, grinding the chunks to form particles of desired mesh size, cold pressing the low-melting glass powder so obtained to predetermined configuration and then heating the pressed glass to temperature between the softening point of the glass up to 100° C. thereabove until the glass particles cohere to produce a physically strong structure.

2. A process for producing a pre-form of low-melting glass which comprises immersing chunks of low-melting glass having a softening point below about 75° C. in a liquefied inert gas until approximately thermal equilibrium is attained, the chunks being cooled by evaporation of the liquefied gas, separating the glass chunks from the liquefied gas, grinding the chunks to form particles of desired mesh size and then cold pressing the low-melting glass powder so obtained to predetermined configuration.

3. A process for producing a pre-form of low-melting glass which comprises immersing chunks of low-melting glass having a melting point of about 250° to 400° C. in liquid nitrogen until approximately thermal equilibrium is attained, the chunks being cooled by evaporation of the liquid nitrogen, separating the glass chunks from the liquid nitrogen, grinding the chunks to form particles of desired mesh size, cold pressing the low-melting glass powder so obtained to predetermined configuration and then heating the pressed glass to temperature between the softening point of the glass up to 100° C. thereabove until the glass particles cohere to produce a physically strong structure.

4. A process for producing a pre-form of low-melting glass which comprises immersing chunks of low-melting glass having a melting point of about 250° to 400° C. in liquid nitrogen until approximately thermal equilibrium is attained, the chunks being cooled by evaporation of the liquid nitrogen, separating the glass chunks from the liquid nitrogen, grinding the chunks to form particles of desired mesh size, cold pressing the low-melting glass powder so obtained to predetermined configuration and then heating the pressed glass to temperature about 25° to 50° C. above the softening point of the glass until the glass particles cohere to produce a physically strong structure.

5. A process for producing a pre-form of low-melting glass which comprises immersing chunks of low-melting glass having a softening point below about 75° C. in liquid nitrogen until approximately thermal equilibrium is attained, the chunks being cooled by evaporation of the liquid nitrogen, separating the glass chunks from the liquid nitrogen, grinding the chunks to form particles of desired mesh size and then cold pressing the low-melting glass powder so obtained to predetermined configuration.

6. A process for producing a pre-form of low-melting glass which comprises immersing ingots of low-melting glass having a melting point of about 250° to 400° C. in liquid nitrogen until approximately thermal equilibrium is attained, the ingots being cooled by evaporation of the liquid nitrogen, separating the glass chunks formed by such treatment from the liquid nitrogen, grinding the chunks to form particles of desired mesh size, cold pressing the low-melting glass powder so obtained to predetermined configuration and then heating the pressed glass to temperature about 25° to 50° C. above the softening point of the glass until the glass particles cohere to produce a physically strong structure.

7. A process for applying a protective coating to an electronic device which comprises placing a pre-form of predetermined configuration composed of low-melting glass having a melting point of about 250° to 400° C. over the device to be protected and then heating the device to temperature about 100° to 200° C. above the softening point of the glass, thereby effecting slow-flowing of the glass over the device so that it becomes encapsulated in the glass.

8. A process for applying a protective coating to an electronic device which comprises placing a pre-form of predetermined configuration composed of low-melting glass having a melting point of about 250° to 400° C. over the device to be protected and then heating the device to temperature about 125° to 150° C. above the softening point of the glass, thereby causing slow-flowing of the glass over the device so that it becomes encapsulated in the glass.

9. A process for coating an electronic device with low-melting glass which comprises cold-pressing low-melting glass powder having a melting point of about 250° to 400° C. to predetermined configuration, heating the pressed glass to temperature between the softening point of the glass up to 100° C. thereabove until the glass particles cohere to produce a physically strong structure, placing said structure over the device to be coated and then heating the device to temperature about 100° to 200° C. above the softening point of the glass, thereby causing slow-flowing of the glass over the device so that it becomes encapsulated in the glass.

10. A process for coating an electronic device with low-melting glass which comprises immersing chunks of low-melting glass having a melting point of about 250° to 400° C. in a liquefied inert gas until approximately thermal equilibrium is attained, the chunks being cooled by evaporation of the liquefied gas separating the glass chunks from the liquefied gas, grinding the chunks to form particles of desired mesh size, cold pressing the low-melting powder so obtained to determined configuration, heating the pressed glass to temperature between the softening point of the glass up to 100° C. thereabove until the glass particles cohere to produce a physically strong structure, placing said structure over the device to be coated and then heating the device to temperature about 100° to 200° C. above the softening point of the glass, thereby causing slow-flowing of the glass over the device so that it becomes encapsulated in the glass.

11. A process for coating an electronic device with low-melting glass which comprises immersing chunks of low-melting glass having a melting point of about 250° to 400° C. in liquid nitrogen until approximately thermal equilibrium is attained, the chunks being cooled by evaporation of the liquid nitrogen, separating the glass chunks from the liquid nitrogen, grinding the chunks to form particles of desired mesh size, cold pressing the low-melting powder so obtained to predetermined configuration, heating the pressed glass to temperature about 25° to 50° C. above the softening point of the glass until the glass particles cohere to produce a physically strong structure, placing said structure over the device to be coated and then heating the device to temperature about 125° to 150° C. above the softening point of the glass, thereby causing slow-flowing of the glass over the device so that it becomes encapsulated in the glass.

12. A process for coating an electronic device with low-melting glass which comprises immersing ingots of low-melting glass having a melting point of about 250° to 400° C. in liquid nitrogen until approximately thermal equilibrium is attained, the ingots being cooled by evaporation of the liquid nitrogen, separating the glass chunks formed by such treatment from the liquid nitrogen, grinding the chunks to form particles of desired mesh size, cold pressing the low-melting powder so obtained to predetermined configuration, heating the pressed glass to temperature about 25° to 50° C. above the softening point of the glass until the glass particles cohere to produce a physically strong structure, placing said structure over the device to be coated and then heating the device to temperature about 125° to 150° C. above the softening point of the glass, thereby causing slow-flowing of the glass over the device so that it becomes encapsulated in the glass.

References Cited in the file of this patent

UNITED STATES PATENTS

| | | |
|---|---|---|
| 1,974,298 | Case | Sept. 18, 1934 |
| 2,489,409 | Green et al. | Nov. 29, 1949 |
| 2,583,697 | Hendry et al. | Jan. 29, 1952 |
| 2,609,150 | Bludeau | Sept. 2, 1952 |
| 2,714,076 | Seckel | July 26, 1955 |
| 2,943,359 | Sussman | July 5, 1960 |
| 2,962,684 | Lien | Nov. 29, 1960 |